United States Patent Office 3,023,114
Patented Feb. 27, 1962

3,023,114
REFRACTORY MATERIAL
Richard D. Becker, Farmington, Mich., assignor to International Minerals & Chemical Corporation, a corporation of New York
No Drawing. Filed Feb. 19, 1959, Ser. No. 794,230
7 Claims. (Cl. 106—56)

This invention relates to an improved refractory material. More particularly, this invention relates to a plastic refractory ramming mixture suitable for the lining of furnaces, ladles and other structures and devices employed in the holding and conveying of molten metals.

Plastic refractories, which are generally referred to in the industry as "plastic ramming mixtures," are essentially moist unformed refractory brick mixtures which are applied as a lining to furnaces and the like, and then fired to form rigid refractory surfaces by heat present in the furnace in which they are installed. Typical plastic refractory mixes are comprised of plastic clays of various compositions and proportions, calcined flint clay, water, and graphite. One disadvantage in using mixes of this type is that the graphite is readily oxidized when contacted with molten metal in the furnace. As a result, the refractory fails rapidly and must be replaced frequently. Ground glass is added as a component of some plastic refractory mixes to inhibit the oxidation of the graphite. However, the inhibitor adds to the cost of preparing the refractory mix, and the effectiveness of the inhibitor is not always satisfactory.

It is an object of this invention to prepare an improved plastic refractory mix.

Another object of the invention is to prepare a carbon-containing plastic refractory mix in which the carbon component resists oxidation when exposed to molten metal.

Still another object of the invention is to provide a carbon-containing plastic refractory mix having improved durability when exposed to molten metal.

These and other objects will become apparent from the following detailed description of the invention.

The present invention, in one aspect, is the composition of an improved plastic refractory mix comprised of plastic clay, calcined flint clay, finely divided fluid coke, and water.

Another aspect of the invention is the method of preparing such refractory compositions.

The novel refractory composition is prepared by admixing plastic fire clay, calcined flint clay, and finely divided fluid coke to form a substantially homogeneous mixture of the solids, and admixing sufficient water therewith to form a plastic mass.

Each of the components of the novel refractory composition will now be described in detail.

An important and essential feature of the invention is the use of finely divided fluid coke as a component of the novel refractory mix to increase the durability of the refractory when contacted with molten metal. Fluid coke is prepared by the well known "fluidized coking" process wherein petroleum pitch is preheated with superheated steam and sprayed onto a fluidized bed of coke particles maintained at a temperature above about 800° F. In this operation the petroleum pitch is decomposed into hydrocarbon vapors and coke. The hydrocarbon vapors are separated and conveyed to a conventional recovery system such as a fractionating tower. The coke is deposited in film-like layers on the finely divided fluidized coke particles, causing a continuous growth in particle size. A portion of the fluid coke is withdrawn continuously from the coking operation, part of which is conveyed to storage, and the remainder of which is comminuted to the desired particle size range and recycled to the fluidized coke bed. The coke is removed from storage, comminuted to pass a screen of about 100 mesh and preferably about 130 mesh, and then used as a component of the instant novel refractory composition. This material generally contains about 93% fixed carbon, about 1% ash, and about 6% volatile constituents, but the fixed carbon content may be as high as 95% by weight. Fluid coke resists oxidation and degraduation when contacted for extended periods with molten metal. Typical processes for preparing fluid coke are described in the patents to James W. Brown, U.S. Patent No. 2,700,017, issued January 18, 1955, and U.S. Patent No. 2,796,391, issued June 18, 1957. The term "fluid coke," as used in the description and claims, refers to coke having the aforesaid properties prepared by the aforesaid processes. The term "finely divided" when used to describe fluid coke in the description and claims refers to particles which pass through a screen of about 100 mesh.

Plastic clays employed in the preparation of the novel refractory composition include fire clay, ball clay, and mixtures thereof. It is preferred to employ a mixture of fire clay and ball clay having a weight ratio of fire clay to ball clay of between about 1:1 and about 2:1, but other proportions may be employed. In a preferred embodiment, a small amount of an activated bentonite clay of the type found deposited in the western and southern parts of the United States is added with the fire clay and/or ball clay to provide the plastic clay component of the novel refractory composition. The plastic clay should be in finely divided form, substantially all of the clay passing a screen of about 140 mesh. The American Foundry Soicety grain fineness number of the plastic clay should be between about 140 and about 270.

Calcined flint clay employed as a component of the novel refractory mixture is prepared by calcining flint clay at a temperature sufficient to effect substantially complete dehydration thereof, and crushing the resulting mass to produce particles substantially all of which pass a screen of between about 4 and about 12 mesh. The crushed particles range in size from an upper size limit of between 4 and 12 mesh to a lower size limit of about 10 microns or smaller. If desired, a mixture of calcined flint clay and raw or "uncalcined" flint clay can be employed. In this event, the weight ratio of calcined flint clay to uncalcined flint clay should be at least about 3:1 in the mixture, since the presence of uncalcined flint clay in proportions less than this causes excessive shrinking of the refractory composition when it is fired. The term "calcined flint clay" as used throughout the description and claims refers to calcined flint clay or mixtures of calcined flint clay and uncalcined flint clay in which the weight ratio of calcined to uncalcined clay is at least about 3:1.

Other siliceous refractory materials may also be employed as a component of the refractory mix if desired. For example, crushed ganister, which is substantially pure crystalline quartz, may be employed. Particle size of the ganister is preferably between about —⅝" +⅛" mesh. A particularly suitable type of ganister is found in the vicinity of Sioux Falls, South Dakota. Grog, which is crushed fire brick, may also be employed as a component of the refractory mix.

The solid components, the range of proportions by weight, and the preferred ranges of solid components used in preparing the novel refractory mix are as follows:

| Solid components | Range of weight proportions, percent | Preferred range, percent |
|---|---|---|
| Plastic clay | 20-40 | 25-35 |
| Fire clay | 0-40 | 10-25 |
| Ball clay | 0-40 | 8-20 |
| Bentonite | 0-4 | 1-3 |
| Calcined flint clay | 45-70 | 50-65 |
| Fluid coke | 5-20 | 10-20 |
| Crushed ganister | 0-25 | 2-5 |
| Grog | 0-25 | 2-5 |

The proportion of fluid coke should not exceed about 20% by weight of the composition on a dry basis, since refractories containing fluid coke in excess of this proportion are subject to relatively rapid deterioration when exposed to molten metal. If the proportion of fluid carbon in the refractory is less than about 5% by weight on a dry basis, a strong bond is created between the refractory and the metal or slag, thereby making it difficult to separate the refractory from the metal or slag.

Solid ingredients in the above described proportions are admixed in a wet pan mixer or the like to form a substantially homogeneous mixture, and water is then added thereto in amounts sufficient to provide a moisture content between about 5 and about 15% and preferably between about 8 and about 12% by weight. If the moisture content is less than about 5% by weight, the plasticity of the resulting mass is inadequate to permit proper working of the mass in the formation of refractory linings. On the other hand, if the moisture content is in excess of about 15% by weight, the mass will be too fluid to work properly, and excessive shrinking of the mass will occur when it is subjected to elevated temperatures.

In a preferred embodiment of the invention, small proportions of other liquid materials are added to the solid components with the water to enhance the binding and plasticity of the resulting mass. For example, an aqueous emulsion of a high melting point asphaltic pitch may be added to provide between about 4 and about 5% by weight of the final mixture. A preferred commercially available form of a suitable aqueous emulsion of a high melting point asphaltic pitch is designated and sold under the trademark "CB-190." The physical properties of CB-190 are as follows: The softening point range of the asphaltic pitch component is from 190 to 205° F. The asphaltic pitch component is very hard and has a penetration number of zero at 77° F., 100 grams, and 5 seconds. The emulsion is prepared by admixing asphaltic pitch, in a colloidal form having a particle size smaller than about 3 microns, with sufficient water to form an aqueous emulsion having a solids content between about 55 and 60% by weight.

Other liquid ingredients which may be employed include molasses, glycerin, and glycols such as ethylene glycol and propylene glycol. One of these liquid ingredients, or a mixture thereof, may be added in a proportion equivalent to between about 0.5 and about 2.5%, and preferably between about 1 and about 2% by weight of the plastic mixture. In the event that molasses is added to the mixture, a preservative such as sodium o-phenylphenate, sold commercially under the trademark Dowicide A, should be added to the molasses to prevent deterioration while storing the plastic refractory mix. If glycerin or a glycol is added to the mixture, the total moisture content of the mixture should not exceed about 12% by weight.

The novel plastic refractory mixture prepared in accordance with the above described procedure is then applied under pressure to the walls and floors of furnaces, ladles and other structures and devices used in the holding and conveying of molten metal. The method of applying the plastic refractory mixture is well known in the art and constitutes no part of this invention. Generally the plastic mixture is formed into slabs which are about one foot long, 9 inches in height and one inch in thickness, but slabs of any desired dimensions can be prepared. These slabs are placed upon the surface to be lined and then pounded with a wooden mallet or air hammer to increase the adhesiveness of the plastic mix to the surface being lined, and to eliminate the seams between the slabs. After the surface has been completely covered with the plastic mass, the furnace is then heated to operating temperatures, whereby the plastic mass is completely dried and converted into a rigid refractory surface. This surface is monolithic and contains no seams which would subsequently permit leakage of molten metal or rapid deterioration of the lining. It will be recognized by those skilled in the art that the plastic refractory mixture may also be employed in patching of refractory linings. Refractory mixes prepared in accordance with this novel invention are far more durable than the plastic refractory mixes containing graphite prepared in accordance with the prior art. This increase in durability is effected by the use of finely divided fluid coke in the aforesaid proportions. The novel refractory material of this invention can withstand extended contact with molten metal at a temperature up to about 3200° F. without substantial deterioration.

As illustrative of the present invention, the following examples are presented without any intention to be limited thereby. All parts and percentages are by weight unless otherwise specified.

*Example I*

Components of the novel refractory mixture were admixed in a wet pan mixer in the following proportions:

| Components: | Parts |
|---|---|
| Plastic fire clay obtained from the vicinity of Lawrence County, Ohio | 13 |
| Ball clay | 10 |
| Western bentonite | 2 |
| Calcined flint clay (−4 mesh +10 microns) | 50 |
| Crushed ganister (−5/8" +1/8" mesh) obtained from the vicinity of Sioux Falls, South Dakota | 10 |
| Finely divided fluid coke [1] | 15 |
| CB-190 [2] | 5 |
| Molasses containing sodium o-phenylphenate | 2 |
| Water | 6.5 |
| Total moisture content | 10 |

[1] Petroleum coke prepared in accordance with the "fluidized coking" process, comminuted to a particle size of approximately 1 to 105 microns, containing 93.14% fixed carbon, 5.78% volatile constituents, and 1.08% ash.
[2] CB-190. An aqueous emulsion of a high melting point asphaltic pitch sold commercially, containing about 58.5% asphaltic solids.

The mixing was effected by first adding the solid components to form a substantially homogeneous mixture and then adding the liquid components to form a plastic mass.

The resulting plastic mass was sliced into slabs of from about one foot in length, about nine inches in height, and about one inch in thickness. These slabs were used to line the taphole of a cupola used in melting iron ore. The slabs were placed on the inner surfaces of the taphole and then impacted with a wooden mallet until they adhered to the taphole surfaces and until all seams between the slabs were obliterated. The furnace was then heated to a temperature of about 1000° F. to dry the plastic refractory mass and to form a continuous rigid refractory surface suitable for contact with the molten metal. The cupola was used for a period of about nine days at temperatures ranging between about 2800 and about 2850° F. without substantial deterioration of the novel refractory lining.

For purposes of comparison, a similar ramming mix was prepared in which graphite was substituted for the finely divided fluid coke, and applied to the same cupola under the same operating conditions. This refractory material lasted only three days, after which it had to be removed and replaced with a new refractory mix.

Example II

A novel plastic refractory mixture was prepared using the procedure and components in the same proportions as in Example I with the exception that the two parts of molasses was replaced with about one part of glycerin. The resulting plastic refractory mixture, when applied to a cupola taphole was found to be as durable as the novel refractory prepared with molasses.

Having thus fully described the invention, I claim:

1. In a plastic refractory composition comprised of plastic clay, flint clay, water and a carbonaceous material, the improvement wherein said carbonaceous material is finely divided fluid coke substantially all of a particle size of less than 100 mesh, said fluid coke being between about 5% and about 20% by weight of said refractory composition.

2. An improved plastic refractory composition comprised of plastic clay, calcined flint clay, between about 5 and about 20% by weight on a dry basis of finely divided fluid coke substantially all of a particle size of less than 100 mesh, and sufficient water to provide a moisture content in the composition of between about 5 and about 15% by weight.

3. The improved composition of claim 2 wherein the proportion of plastic clay in the composition on a dry basis is between about 20 and about 40% by weight, the plastic clay consisting essentially of a mixture of plastic fire clay, ball clay, and western bentonite, the proportion of western bentonite in said composition on a dry basis being between about 1 and about 3% by weight.

4. An improved plastic refractory composition consisting essentially of between about 20 and about 40% plastic clay, between about 45 and about 70% calcined flint clay, between about 5 and about 20% by weight on a dry basis of finely divided fluid coke substantially all of a particle size of less than 100 mesh, and sufficient water to provide a moisture content in the composition of between about 8 and about 12% by weight.

5. The composition of claim 4 which contains between about 4 and about 5% by weight of an aqueous emulsion of a high melting point asphaltic pitch, and between about 0.5 and about 2.5% by weight of glycerin.

6. The composition of claim 4 which contains between about 4 and about 5% by weight of an aqueous emulsion of a high melting point asphaltic pitch and between about 0.5 and about 2.5% by weight of molasses.

7. An improved plastic refractory composition consisting essentially of between about 10 and about 25% plastic fire clay, between about 8 and about 20% ball clay, between about 1 and about 3% western bentonite, between about 2 and about 5% crushed ganister, between about 10 and about 20% finely divided fluid coke by weight on a dry basis substantially all of a particle size of less than 100 mesh, and containing liquid ingredients consisting essentially of an aqueous emulsion of a high melting point asphaltic pitch in an amount between about 4 and about 5%, glycerin in an amount between about 0.5 and about 1.5%, and water in an amount between about 8 and about 12% by weight of the composition.

References Cited in the file of this patent

UNITED STATES PATENTS

| | | |
|---|---|---|
| 2,465,375 | Hendren | Mar. 29, 1949 |
| 2,626,871 | Zinszer | Jan. 27, 1953 |
| 2,688,562 | West et al. | Sept. 7, 1954 |
| 2,772,176 | Leitten | Nov. 27, 1956 |